United States Patent

Komatsu

[11] Patent Number: 6,016,359
[45] Date of Patent: Jan. 18, 2000

[54] COLOR IMAGE CONVERTING APPARATUS AND METHOD FOR DETERMINING WHEN A HOMOGENEOUS COLOR SPACE IS LOCATED OUTSIDE OF A REPRODUCIBLE COLOR SPACE

[75] Inventor: Manabu Komatsu, Tokyo, Japan

[73] Assignee: Ricoh Company, Ltd., Tokyo, Japan

[21] Appl. No.: 08/970,153

[22] Filed: Nov. 13, 1997

Related U.S. Application Data

[63] Continuation of application No. 08/359,146, Dec. 19, 1994, abandoned.

[30] Foreign Application Priority Data

Dec. 29, 1993 [JP] Japan ..................... 5-354615

[51] Int. Cl.[7] .......................... G06K 9/00
[52] U.S. Cl. ......................... 382/162; 358/518
[58] Field of Search ................... 382/162, 166, 382/167; 358/518, 520, 522, 523

[56] References Cited

U.S. PATENT DOCUMENTS

| | | | |
|---|---|---|---|
| 4,910,589 | 3/1990 | Nagano et al. | 358/518 |
| 4,929,978 | 5/1990 | Kanamori et al. | 358/520 |
| 5,146,328 | 9/1992 | Yamasaki et al. | 358/519 |
| 5,233,413 | 8/1993 | Fuchsberger | 358/518 |
| 5,237,409 | 8/1993 | Yamaguchi | 358/518 |
| 5,289,295 | 2/1994 | Yumiba et al. | 358/518 |
| 5,299,291 | 3/1994 | Ruetz | 358/518 |
| 5,307,088 | 4/1994 | Inuzuka et al. | 358/518 |
| 5,319,473 | 6/1994 | Harrington | 358/518 |
| 5,390,034 | 2/1995 | Murakami et al. | 358/518 |
| 5,414,538 | 5/1995 | Eschbach | 358/522 |
| 5,420,704 | 5/1995 | Winkelman | 358/520 |
| 5,436,739 | 7/1995 | Imao et al. | 358/518 |
| 5,495,428 | 2/1996 | Schwartz | 382/167 |
| 5,502,579 | 3/1996 | Kita et al. | 358/520 |
| 5,515,172 | 5/1996 | Shiau | 358/518 |
| 5,539,540 | 7/1996 | Spaulding et al. | 358/518 |

Primary Examiner—Amelia Au
Assistant Examiner—Jingge Wu
Attorney, Agent, or Firm—McDermott, Will & Emery

[57] ABSTRACT

A color image converting apparatus and color image converting method thereof according to the present invention decides, when it is determined that a signal for a homogeneous color space is present outside a reproducible color space, the necessity of color space compression and the compressing direction for each unit region according to a frequency of occurrence of the signal for each unit region for unit regions present on a plane within an area having constant brightness including the corresponding region, and outputs colors as closest to the original colors as possible preserving color balance and impression of the input color image signal by mapping a unit region decided to be subjected to color space compression onto another region in the compressing direction.

6 Claims, 11 Drawing Sheets

COLOR IMAGE CONVERTING APPARATUS AND METHOD FOR DETERMINING WHEN A HOMOGENEOUS COLOR SPACE IS LOCATED OUTSIDE OF A REPRODUCIBLE COLOR SPACE

This application is a continuation of application Ser. No. 08/359,146 filed Dec. 19, 1994 abandoned.

FIELD OF THE INVENTION

The present invention relates to a color image converting apparatus and color image converting method thereof which forms an image with a color image forming device by executing color processing to an input color image signal to convert to color image data.

BACKGROUND OF THE INVENTION

In a conventional type of color image converting apparatus, when inputting a color image signal and executing color processing to convert the color image signal to color image data for forming a color image, if color image data at a position exceeding a reproducible color space of the image forming device is inputted, ① a method of detecting and outputting a position within the reproducible color space closest to the position of the color image data, or ② a method of compressing the input color image toward the center of gravity of the reproducible color space and outputting it is employed.

However, in the conventional technology as described above, in the method ①, as a position within a reproducible color space closest to a color image data position is detected and outputted, a color exceeding the reproducible color space is converted to a color at an utmost periphery of the reproducible color space, and if there is a color at the utmost periphery of the reproducible color space, the converted color becomes the same as the color originally existing there, which is disadvantageous.

Especially, in case of a synthetic image formed on a computer screen, if a color which should originally be different is outputted as the same color, it is remarkable, and the outputted image gives an impression that the image is different from that of the computer screen.

In the method ②, an input color image signal is compressed toward the center of gravity of a reproducible color space, so that the problem in the method ②. does not occur, but if the input color image signal is substantially included in a reproducible color space, or when only a color having a specific hue exceeds a reproducible color space, even a color within the reproducible color space is converted in a direction toward non-color, and an image generally not having color attractiveness may be outputted.

SUMMARY OF THE INVENTION

It is an object of the present invention to compress an input color image signal into a reproducible color space of a color image forming device so that color balance and impression of an input color image signal is preserved as much as possible and colors as closest to the original colors as possible are outputted.

A color image converting apparatus and color image converting method thereof according to the present invention divides a homogeneous color space into a specified number of unit regions, obtains a frequency of occurrence of a signal for a homogeneous color space included in each unit region, compares a range of a reproducible color space of a color image forming device in a homogeneous color space to each unit region, makes a determination as to whether a signal for a homogeneous color space exists outside the reproducible color space or not, decides, when it is determined that a signal for a homogeneous color space is present outside a reproducible color space, the necessity of color space compression and the compressing direction for each unit region according to a frequency of occurrence of the signal for each unit region for unit regions present on a plane within an area having constant brightness including the corresponding region, and outputs colors as closest to the original colors as possible preserving color balance and impression of the input color image signal by mapping a unit region decided to be subjected to color space compression onto another region in the compressing direction.

A color image converting apparatus and color image converting method thereof according to the present invention stores, when a user previously inputs a compressing direction for a unit region, the inputted compressing direction, decides the necessity of color space compression and the compressing direction for each unit region according to a frequency of occurrence of each unit region as well as the stored compressing direction, and maps a unit region decided to be subjected to color space compression onto another region in the compressing direction, so that the user can freely select a compressing direction and can accurately compress a color image into a reproducible color space preserving the same hue in a saturation direction.

A color image converting apparatus and color image converting method thereof according to the present invention makes a determination according to a frequency of occurrence as to whether a signal for a homogeneous color space is distributed on a plane within an area having constant brightness in the homogeneous color space, subdivides a unit region concentrically on a plane within an area having constant brightness of the corresponding homogeneous color space when the signal is distributed homogeneously, and again obtains a frequency of occurrence regarding the subdivided region as a new unit region, so that, even a color signal for an image widely distributed over a homogeneous color space is inputted, color balance and impression of the image can be preserved and outputted with colors as closest to the original colors as possible.

Other objects and features of this invention will become understood from the following description with reference to the accompanying drawings.

DESCRIPTION OF THE PREFERRED EMBODIMENTS

Detailed description is made hereinafter for a color image converting apparatus according to the present invention in the order of Embodiment 1, Embodiment 2 and Embodiment 3 with reference to the related drawings.

Figure 1:
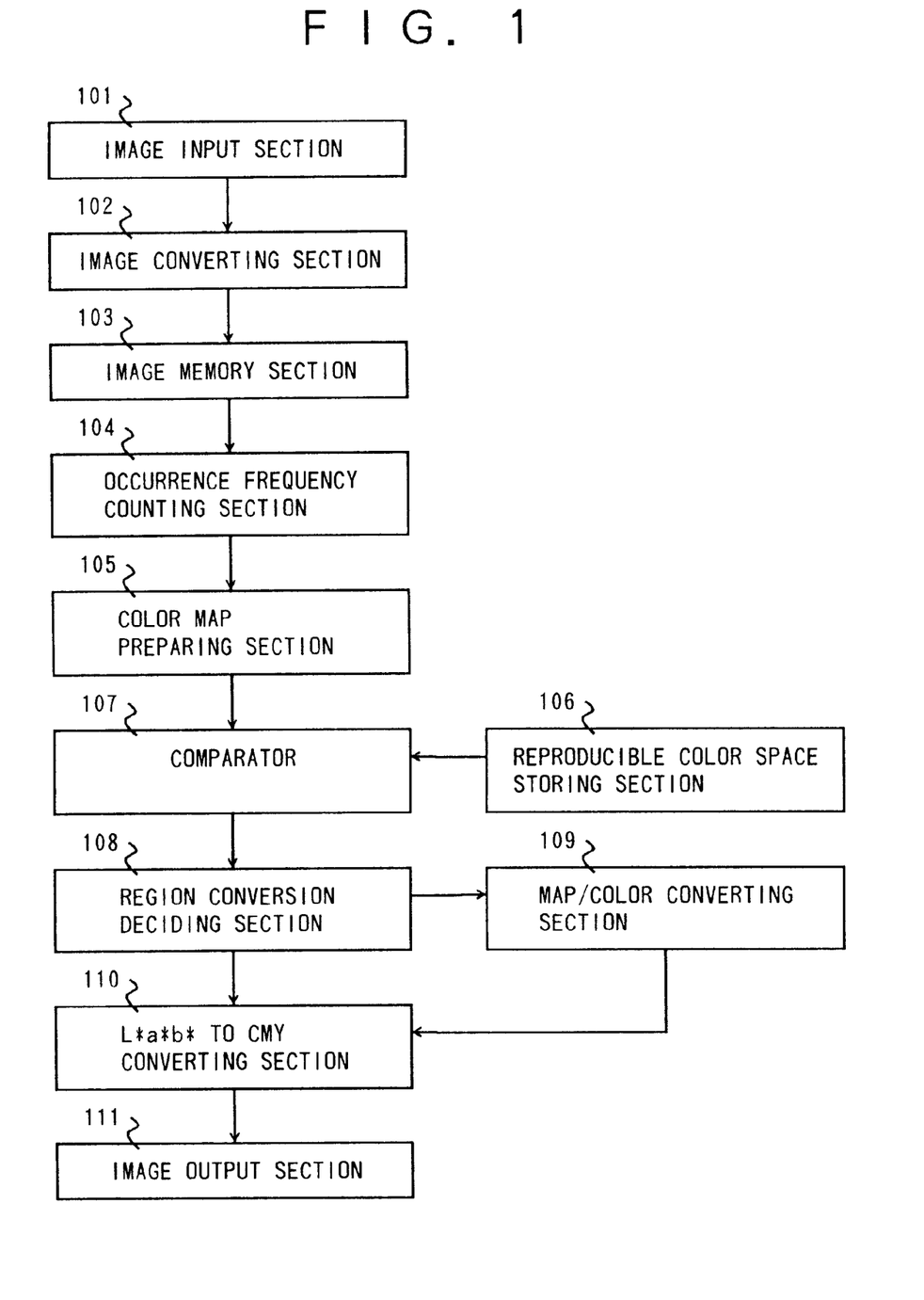
FIG. 1 is a general block diagram showing a color image converting apparatus according to Embodiment 1 of the present invention.

FIG. 1 is a general block diagram illustrating a color image converting apparatus according to Embodiment 1, and the color image converting apparatus comprises an image input section 101 into which a color image signal such as R, G, and B is inputted from such a device as a scanner or a computer, a color converting section 102 for converting the color image signal inputted in the image input section 101 to a color within an L*a*b* space which is a homogeneous color space, an image memory section 103 for preserving image data converted to an L*a*b* signal in the color converting section 102, an occurrence frequency counting section 104 for inputting therein image data from the image memory section 103 and obtaining an occurrence frequency of image data included in each of specified unit regions, a color map preparing section 105 for preparing a color map for the input image data, a reproducible color space storing section 106 in which is stored a range of reproducible color space in a homogeneous color space of a color image forming device (not shown herein) for inputting color image data therein from the color image converting apparatus according to Embodiment 1 and forming an image, a comparator 107 for comparing each unit region to a range of a reproducible color space stored in the reproducible color space storing section 106 and making a determination as to whether image data exists outside the range of the reproducible color space or not, a region conversion deciding section 108 for deciding the necessity of color space compression and a compressing direction for each unit region for unit regions present on a plane within an area having constant brightness in a homogeneous color space including the unit region according to a frequency of occurrence of each unit region when it is determined by the comparator 107 that image data is present outside a range of the reproducible color space, a map/color converting section 109 for mapping a unit region decided to be subjected to color space compression in the region conversion deciding section 108 onto another region in the compressing direction, an L*a*b* to CMY converting section 110 for converting image data (L*a*b* signal) to an output signal (CMY signal) from a color image forming device, and an image output section 111 for inputting therein image data (CMY signal) from the L*a*b* to CMY converting section 110 and outputting it to a color image forming device.

It should be noted that in this embodiment the occurrence frequency counting section 104 also plays a role of a dividing means for dividing a homogeneous color space into a specified number of unit regions.

Figure 4:
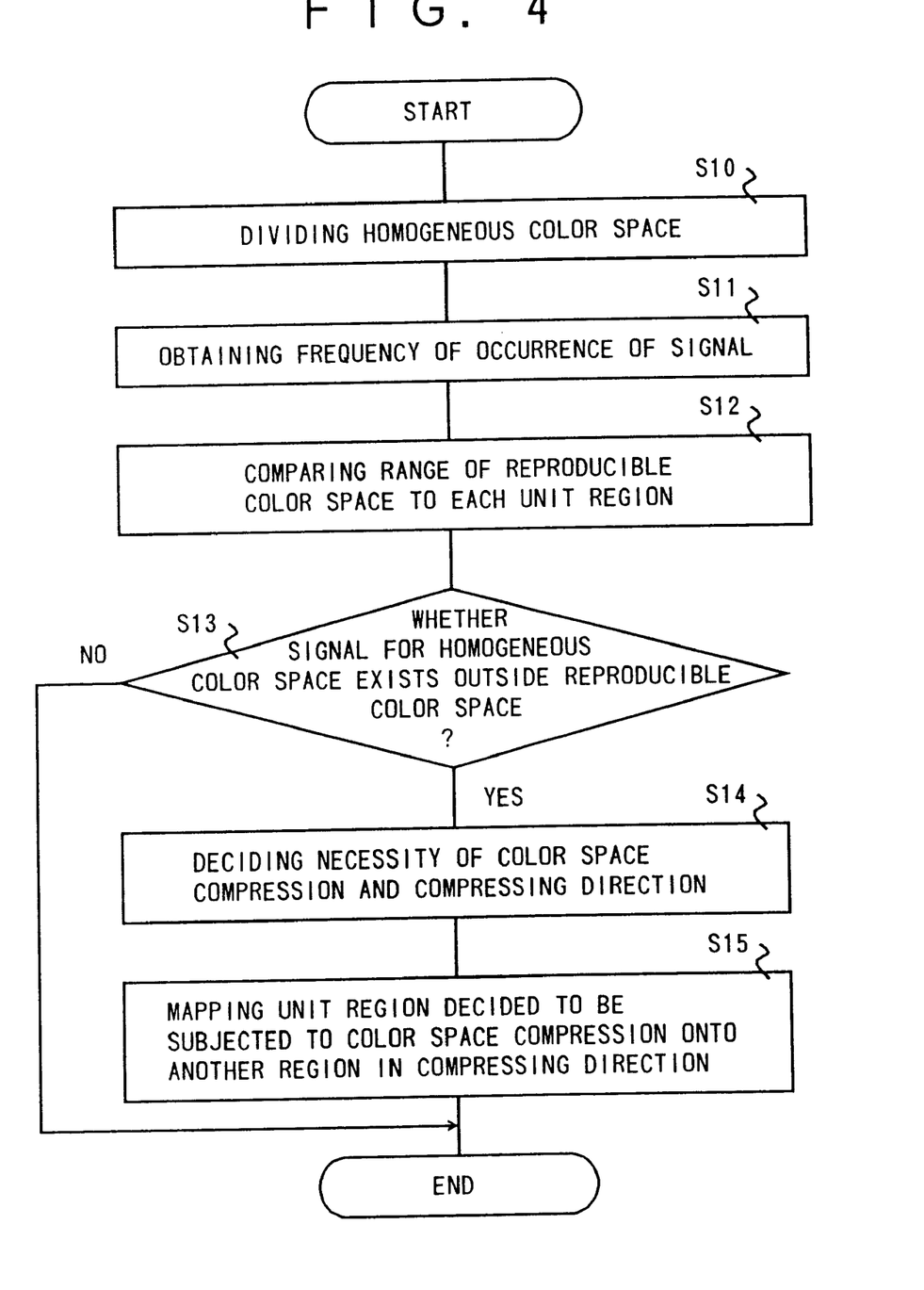
FIG. 4 is a flow chart showing operations of Embodiment 1.

With the configuration above, next description is made for operations thereof in accordance with FIG. 4. An input color image signal inputted through an image input section 101 is converted in the color converting section 102 to a color in an L*a*b* space which is a homogeneous color space, and is written in the image memory section 103.

Figure 2:
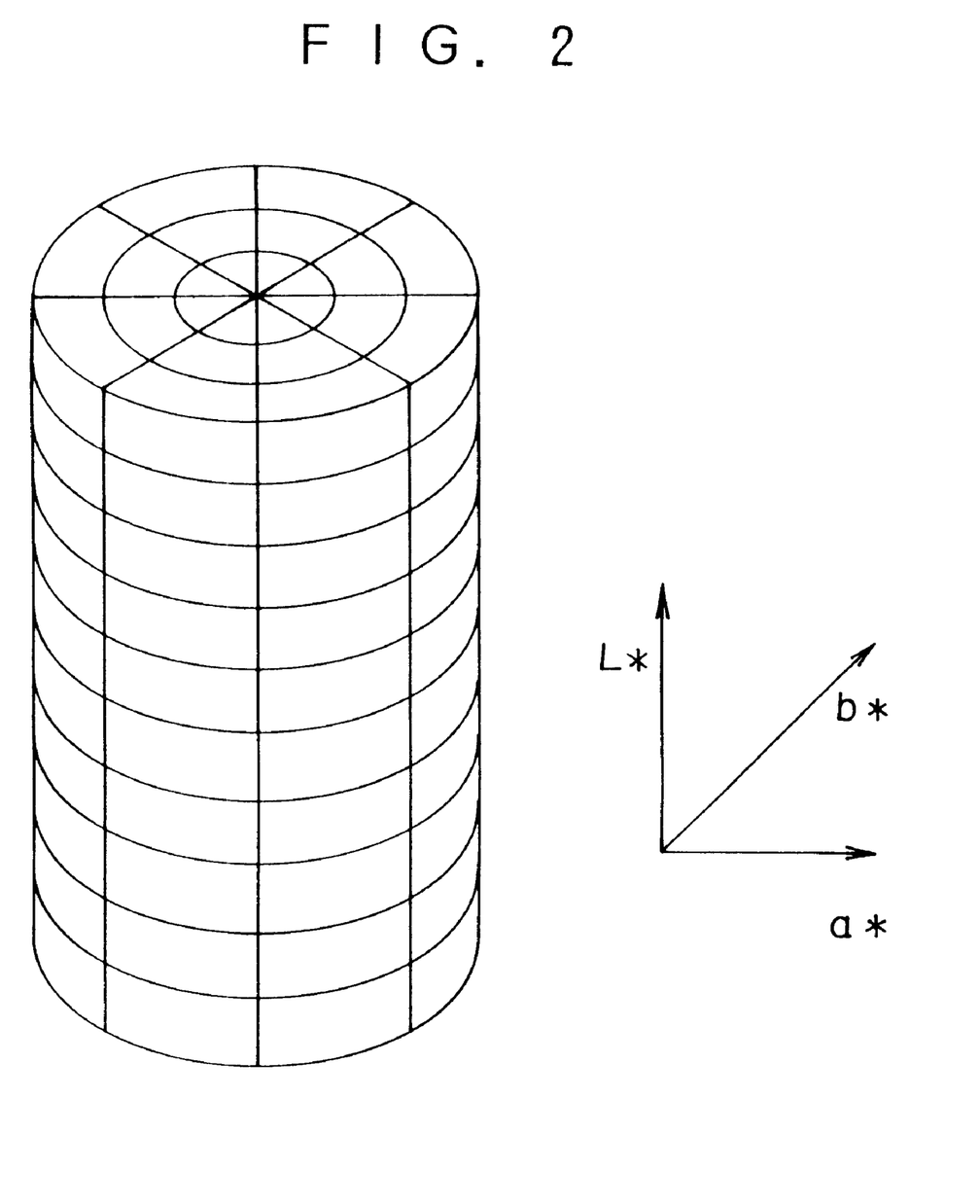
FIG. 2 is an explanatory view showing division of a homogeneous color space and a divided unit region.

As shown in FIG. 2, the occurrence frequency counting section 104 divides a homogeneous color space into a plurality of unit regions (S10), detects to which unit region of the homogeneous color space the L*a*b* signal stored in the image memory section 103 belongs, and counts a number of images (occurrence frequency) for each unit region (S11).

Then in the color map preparing section 105 a color map of input image data (herein an L*a*b* signal) is prepared, the color map is compared by a comparator 107 to a range of reproducible color space stored in the reproducible color space storing section 106 for each unit region (S12), and a determination is made as to whether the input image data is present outside a range of a reproducible color space of a color image forming device or not (S13).

Figure 3:
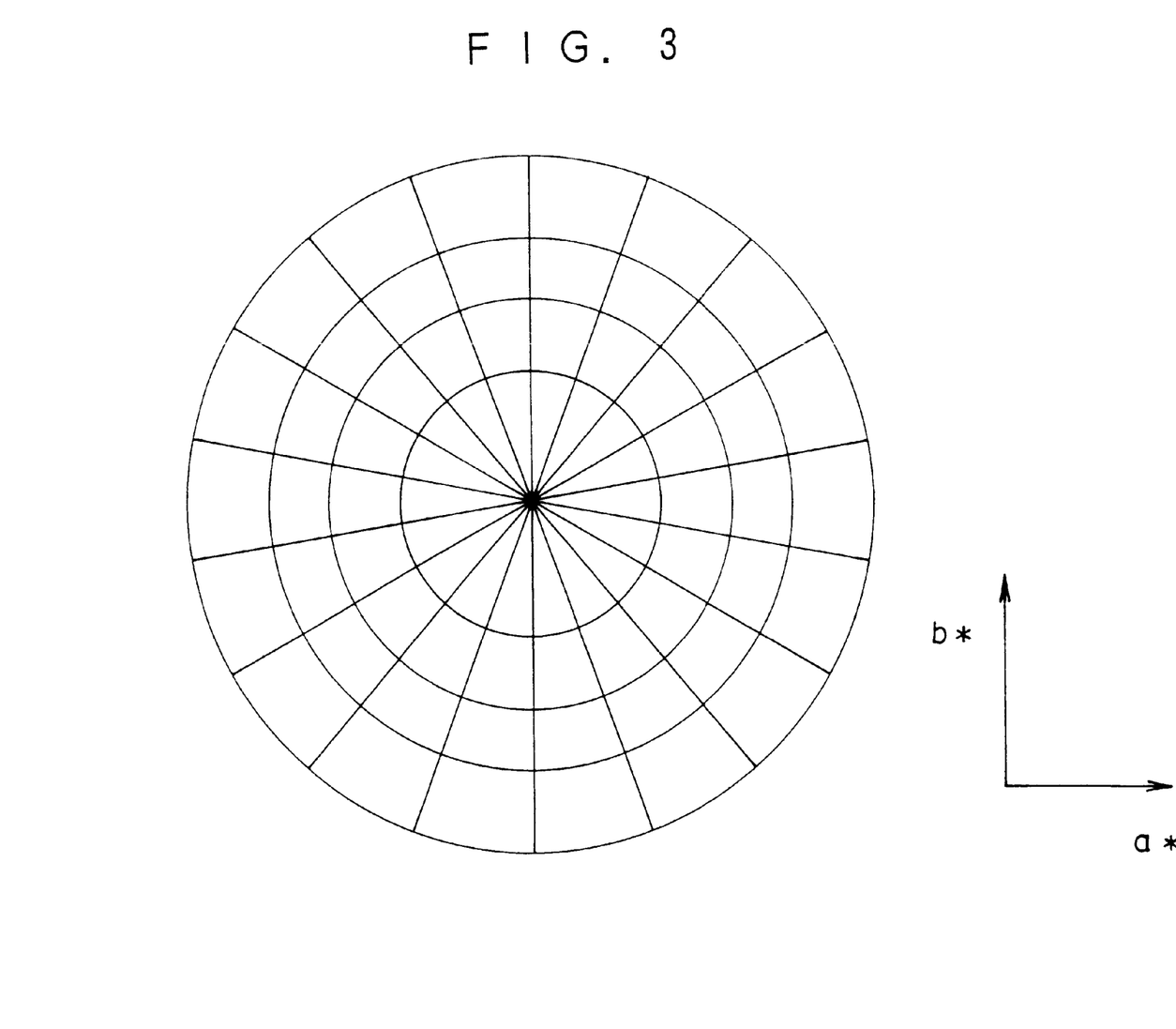
FIG. 3 is an explanatory view showing a direction in which color is compressed.

If image data is present outside a range of a reproducible color space in a unit region, a region where image data is not distributed, or distributed a little is found by the region conversion deciding section 108 on a plane within an area having constant brightness among regions in the radial direction (hue direction) as shown in FIG. 3, and the unit regions to be displaced inward in the radial direction described above and those to be left as they are are decided according to the state (S14).

In this step, distribution of image data is determined according to the occurrence frequency obtained by the occurrence frequency counting section 104. It should be noted that a unit region in which image data is not present outside a range of the reproducible color space is decided as a unit region to be left as it is.

In the region conversion deciding section 108, image data within a region decided as a unit region to be displaced inward in the radial direction is subjected to color conversion by means of mapping between regions by the map/color converting section 109, and then is sent to the L*a*b* to CMY converting section 110.

On the other hand, image data (L*a*b* signal) in a region decided as a unit region to be left as it is in the region conversion deciding section 108 is sent as it is to the L*a*b* to CMY converting section 110.

In the L*a*b* to CMY converting section 110, the L*a*b* signal is converted to a CMY signal which is an output control signal for a color image forming device by using a memory map. Image data converted to a CMY signal in the L*a*b* to CMY converting section 110 is outputted through the image output section 111 to a color image forming apparatus, thus an image being formed (S15).

As described above, in Embodiment 1, a color space for an input color image signal is compressed to a reproducible color space of a color image forming device which is an image forming means, yet an image having colors as closest to the original colors as possible can be outputted preserving color balance and impression of the input color image signal.

Figure 5:
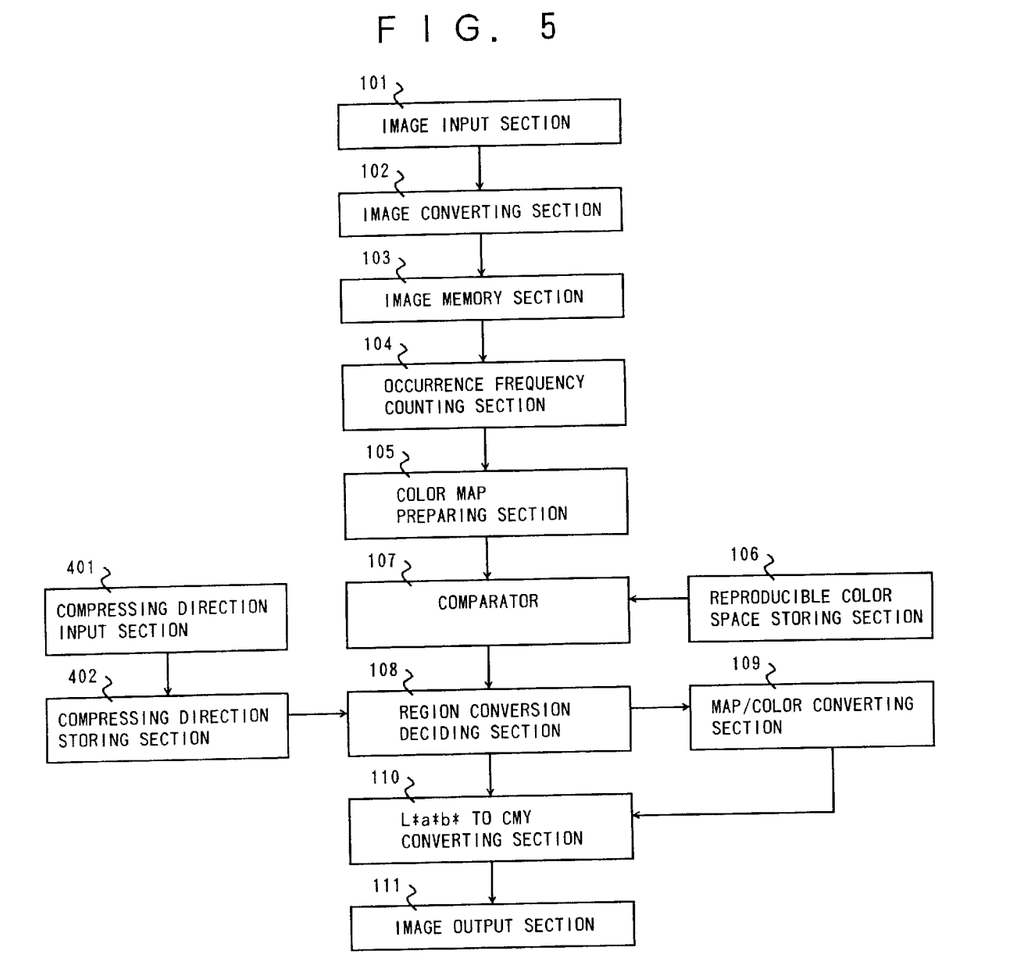
FIG. 5 is a general block diagram showing a color image converting apparatus according to Embodiment 2 of the present invention.

FIG. 5 is a general block diagram illustrating a color image converting apparatus according to Embodiment 2 comprising, in addition to configuration of Embodiment 1 in FIG. 1, a compressing direction input section 401 for a user to previously input a direction in which a unit region is compressed, and a compressing direction storing section 402 for storing therein a compressing direction inputted in the compressing direction input section 401. It should be noted that the same reference numerals as those in Embodiment 1 indicate the same components and description thereof is omitted herein.

Figure 6:
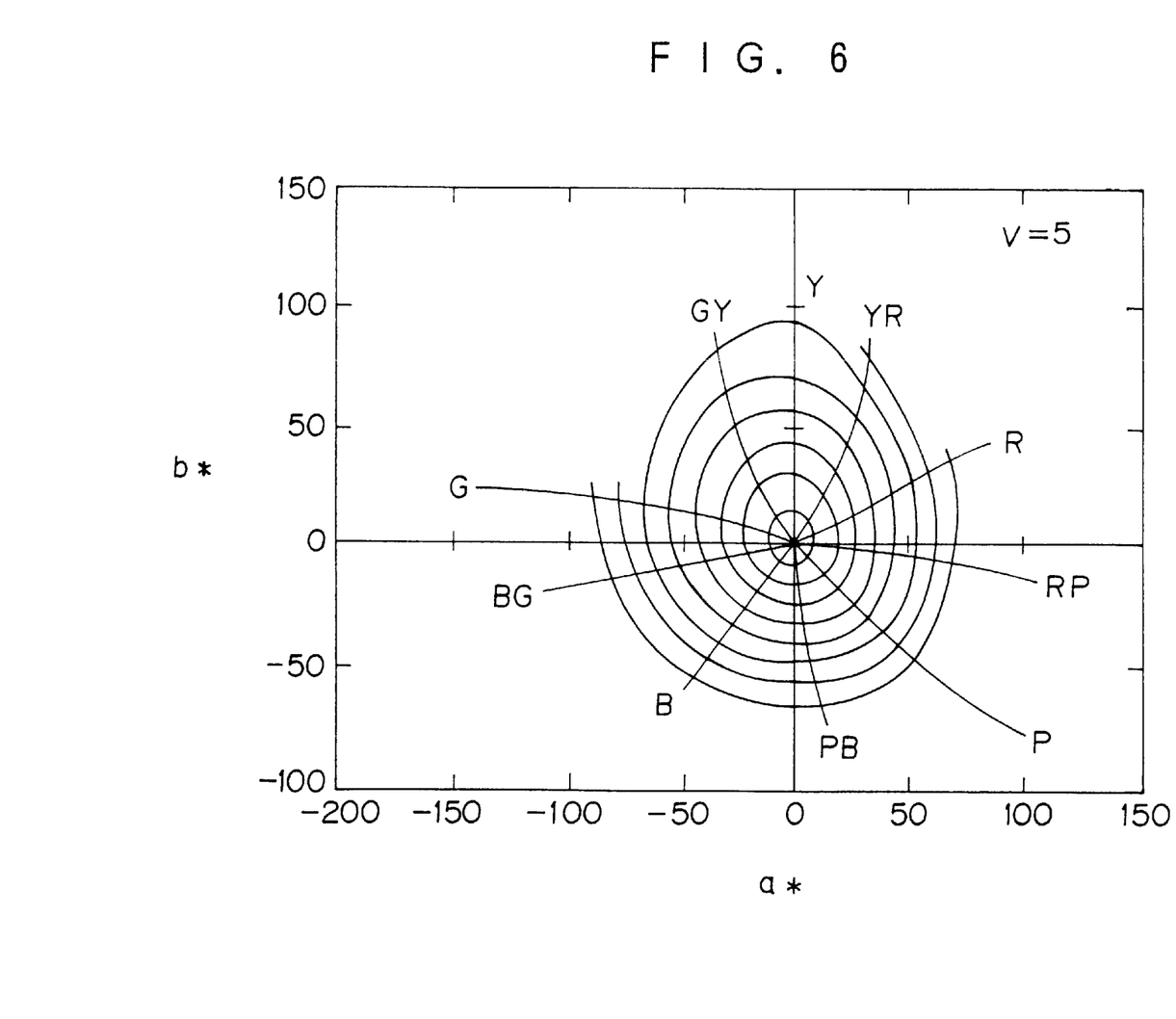
FIG. 6 is an explanatory view for equal hue such as a Munsell color system.
Figure 7:
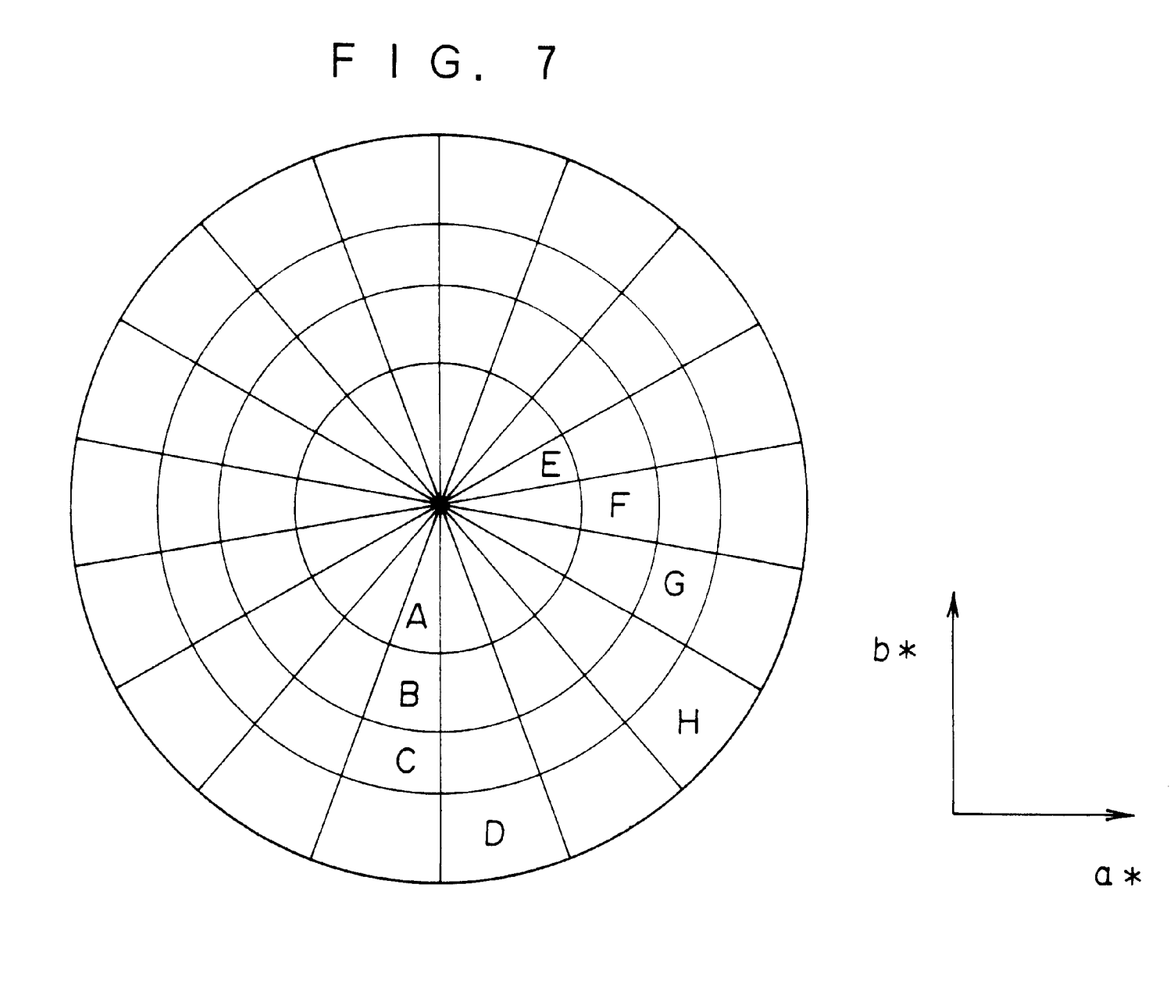
FIG. 7 is an explanatory view showing a direction in which a color is compressed.
Figure 8:
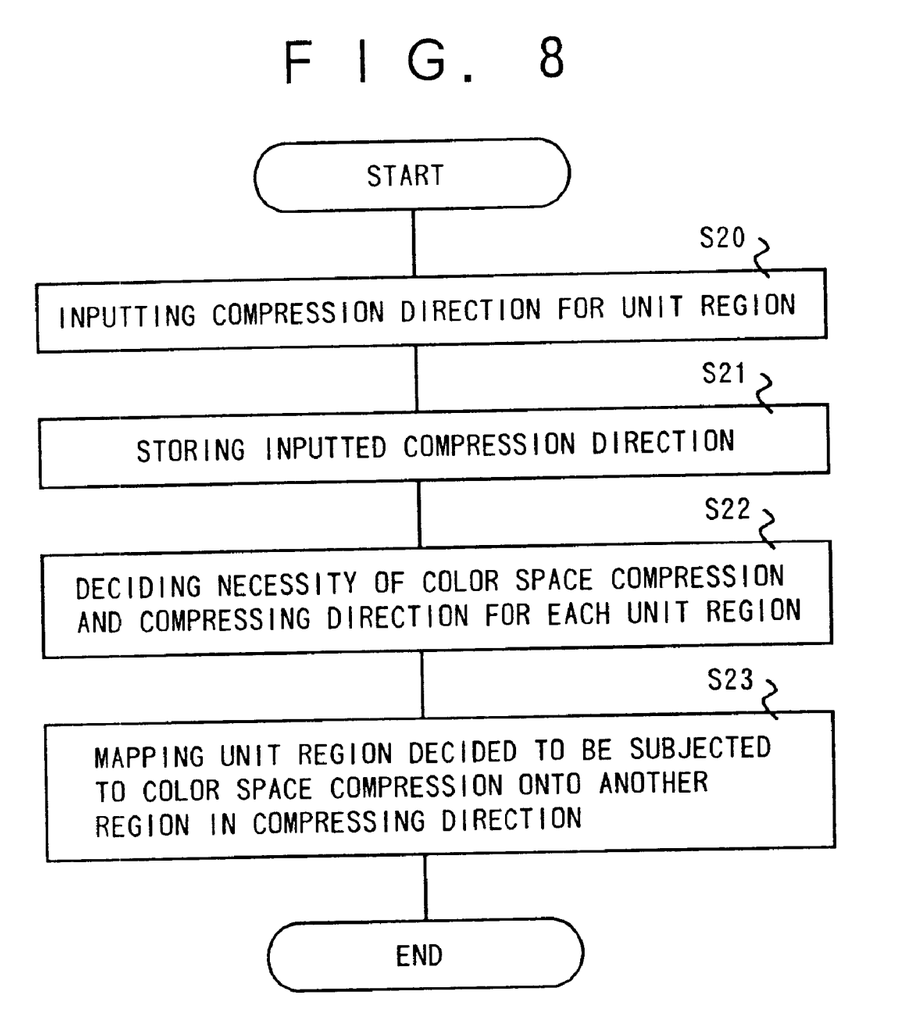
FIG. 8 is an flow chart showing operations of Embodiment 2.

In Embodiment 1, in the L*a*b* space, as shown in FIG. 3, compression is executed regarding unit regions in an area having constant brightness in the radial direction on a plane as those having the same hue. Practically, however, as shown in FIG. 6, equal hue of a Munsell color system is not always extending radially even in a homogeneous color space. For this reason, in Embodiment 2, as shown in FIG. 8, when a user inputs an actual equal hue direction such as, for instance, A→B→C→D or E→F→G→H, or a compressing direction desirable to the user (S20), the compressing direction for a region is stored in the compressing direction storing section 402 (S21), regions in which image data is not distributed or distributed only a little in a direction specified on a plane within an area having constant brightness shown in FIG. 7 are found, and regions to be displaced inward in the set direction (in the compressing direction stored in the compressing direction storing section 402) and those to be left as they are are decided (S22).

Image data present in a region decided as a unit region to be displaced inward in the radial axial direction described above in the region conversion deciding section 108 is subjected to color conversion by means of mapping between regions and then sent to the L*a*b* to CMY converting section 110.

On the other hand, image data (L*a*b* signal) present in a region decided as a unit region to be left as it is in the region conversion deciding section 108 is sent as it is to the L*a*b* to CMY converting section 110.

In the L*a*b* to CMY converting section 110, the L*a*b* signal is converted to a CMY signal which is an output control signal from a color image forming device. The image data converted to a CMY signal in the L*a*b* to CMY converting section 110 is outputted through the image output section 111 to the color image forming device, where an image is formed (S23).

As described above, in Embodiment 2, a color space for an input color image signal is compressed to a reproducible color space of a color image forming device which is an image forming means, yet an image having colors closest to the original colors as possible can be outputted preserving color balance and impression of the input color image signal. Also it is possible to compress an image into an accurate reproducible color space with the same hue in the saturation direction.

Figure 9:
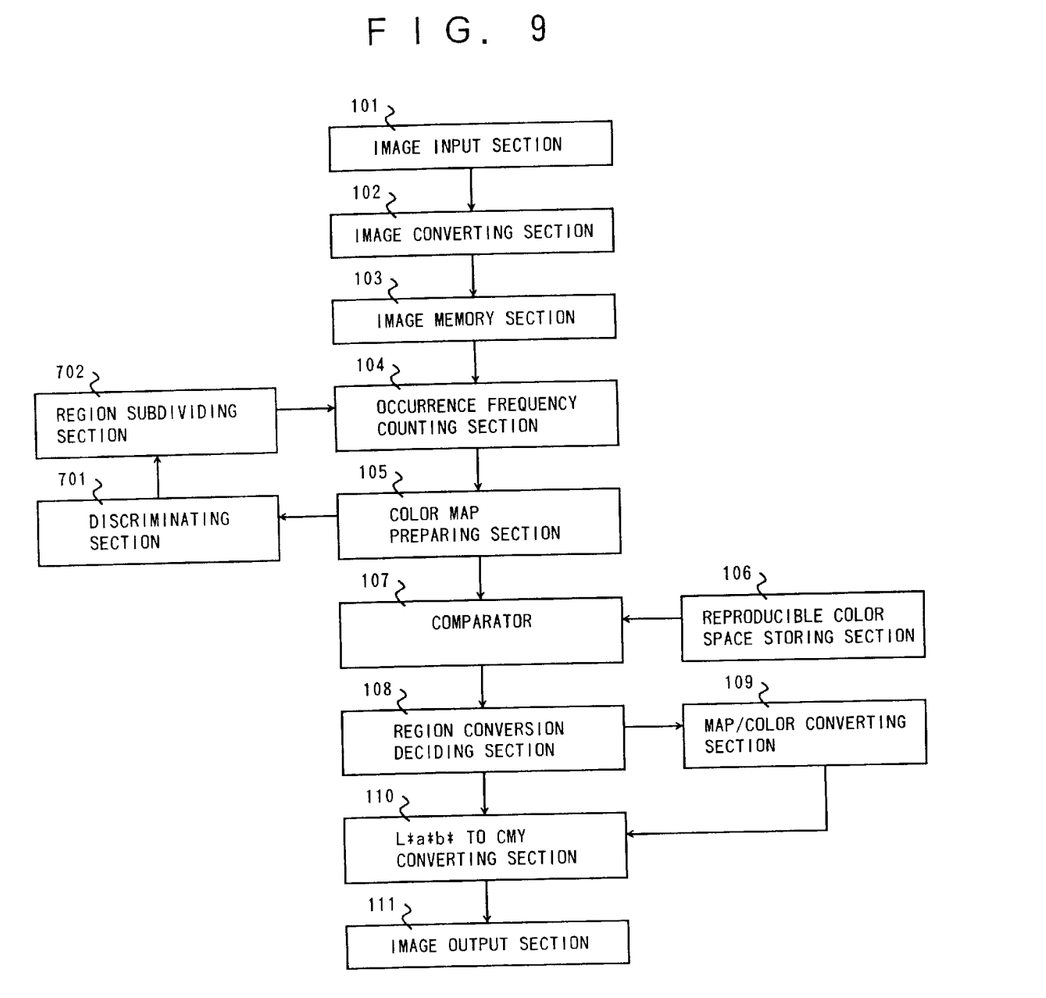
FIG. 9 is a general block diagram showing a color image converting apparatus according to Embodiment 3 of the present invention.

FIG. 9 is a general block diagram illustrating a color image converting apparatus according to Embodiment 3, and the color image converting apparatus comprises, in addition to configuration of Embodiment 1 shown in FIG. 1, a discriminating section 701 for making a determination as to whether a signal for a homogeneous color space is homogeneously distributed on a plane within an area having constant brightness in the homogeneous space or not according to the occurrence frequency obtained in the occurrence frequency counting section 104, and a region subdividing section 702 for subdividing , when it is determined by the discriminating section 701 that the signal is homogeneously distributed, a unit region concentrically on a plane within an area having constant brightness of the corresponding homogeneous color space and causing again the occurrence frequency counting section 104 to obtain occurrence frequency regarding each of the subdivided regions as a new unit region. It should be noted that the same reference numerals common to those in Embodiment 1 indicate the same components and description thereof is omitted herein.

Figure 10:
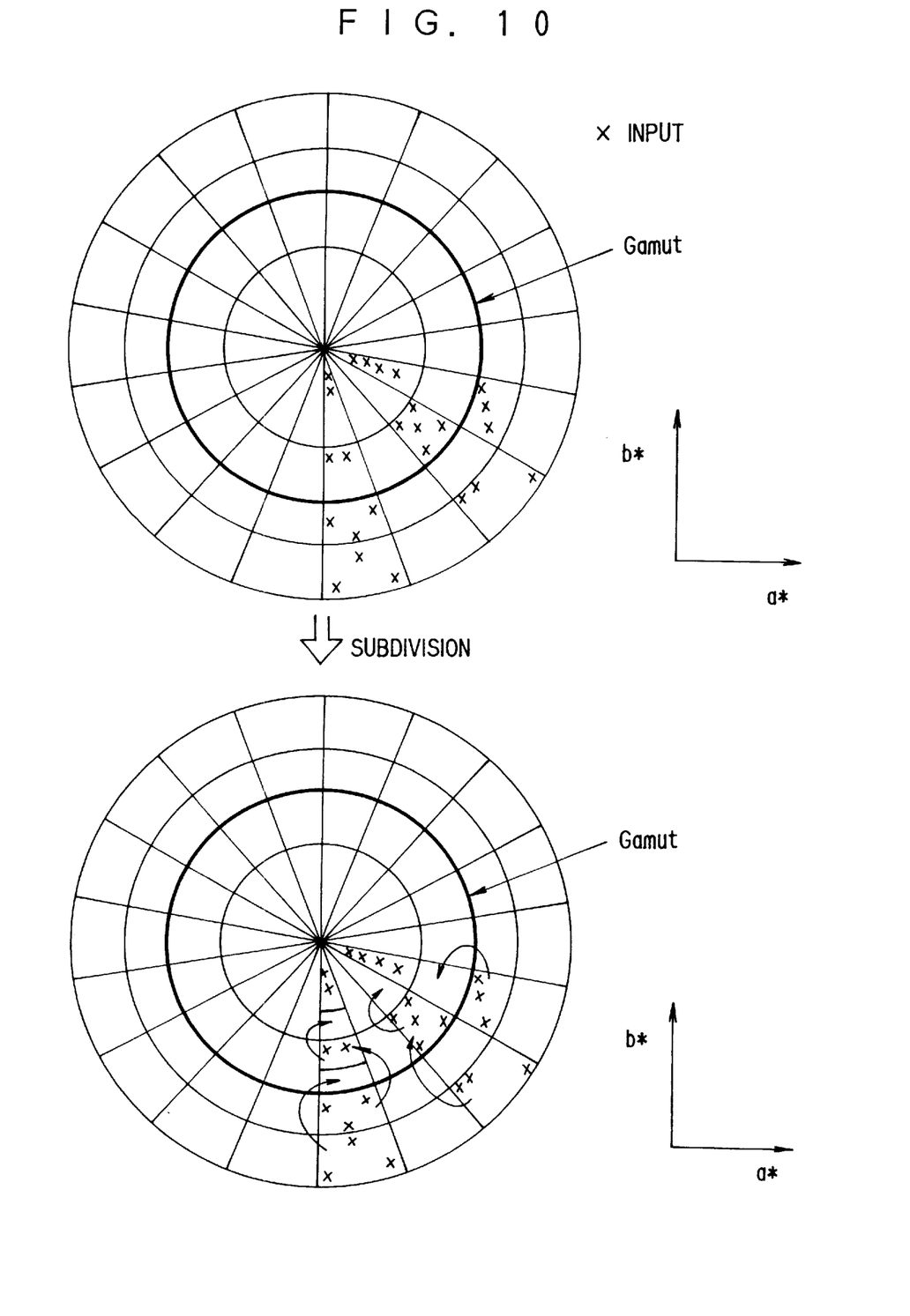
FIG. 10 is an explanatory view showing an image data which is homogeneously distributed in regions in the compressing axial direction.
Figure 11:
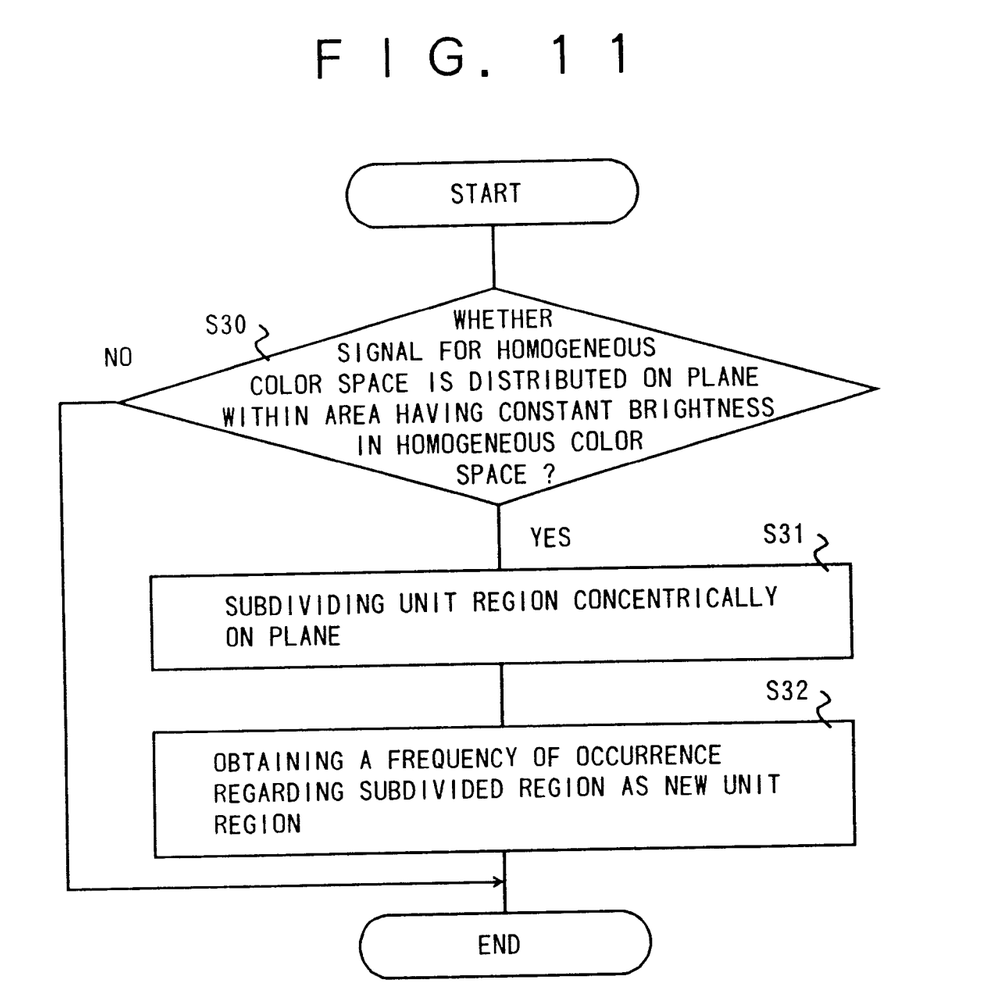
FIG. 11 is a flow chart showing operations of Embodiment 3.

In FIG. 11, a determination is executed in the discriminating section 701 as to whether image data is homogeneously distributed or not in regions in the compressing axial direction when a color map of an input image prepared on the color map preparing section 105 is seen on a plane within an area having constant brightness (S30), and if it is determined that image data is homogeneously distributed in regions in the compressing axial direction as shown in FIG. 10, the regions only in the direction are concentrically subdivided by the region subdividing section 702 on a plane within an area having constant brightness, and counting of occurrence frequency in the occurrence frequency counting section 104 is again executed for each of the subdivided regions (S31).

When a number of pixels in each region is counted by the occurrence frequency counting section 104, a color map for the input image is again prepared by the color map preparing section 105. The operations by the discriminating section 701 and the region subdividing section 702 are executed until a difference in distribution appears, and when the operations are finished, operational sequence in the comparator 107 and on is executed line in Embodiment 1 (S31).

In Embodiment 3, as described above, a color space for an input color image signal is compressed into a reproducible color space of a color image forming device which is an image forming means, yet the image having the same colors as closest to the original colors as possible can be outputted preserving the color balance and impression of the input color image signal.

Also a region is subdivided in the discriminating section 701 as well as in the region subdividing section 702 until a difference in distribution appears in the color map, even an image distributed in a wide range like a natural image can be outputted with colors as closest to the original colors as possible by a color image forming device.

As described above, the color image converting apparatus and color image converting method thereof according to the present invention comprises a memory for storing therein a range of a reproducible color space of the color image forming device in a homogeneous color space, a converter for converting an input color image signal to a homogeneous color space signal, a divider for dividing a homogeneous color space into a specified number of unit regions, an occurrence frequency counter for obtaining an occurrence frequency of a signal for a homogeneous color space included in each unit region, a discriminator for comparing a range of the reproducible color space stored in the memory for each unit region and making a determination as to whether a homogeneous color space signal exists outside a range of the reproducible color space or not, a compression deciding device for deciding, when it is determined by the discriminator that a signal for a homogeneous color space exists outside a range of the reproducible color space, the necessity of color conversion and the compressing direction for each unit region according to an occurrence frequency of each of unit regions for unit regions present on a plane within an area having constant brightness in a homogeneous color space including corresponding unit regions, and a mapping device for mapping image data in unit regions decided as those to be subjected to color space compression by the compression deciding device onto other regions in the compressing direction, and for this reason an input color image signal can be compressed into a reproducible color space of a color image forming device so that colors as closest to the original colors as possible can be outputted preserving the color balance and impression of the input color image signal.

The color image converting apparatus and color image converting method thereof according to the present invention comprises a memory for storing therein a range of a reproducible color space of the color image forming device in a homogeneous color space, a converter for converting an input color image signal to a homogeneous color space signal, a divider for dividing a homogeneous color space into a specified number of unit regions, an occurrence frequency counter for obtaining an occurrence frequency of a signal for a homogeneous color space included in each unit region, a discriminator for comparing a range of the reproducible color space stored in the memory for each unit region and making a determination as to whether a homogeneous color space signal exists outside a range of the reproducible color space or not, a compressing direction input device for a user to previously input an inputting a compressing direction for a unit region, a compressing direction memory for storing therein the compressing direction inputted by the compressing direction input device, a compression deciding device for deciding, when it is determined by the discriminator that a signal for a homogeneous color space exists outside a range of the reproducible color space, the necessity of color conversion and the compressing direction for each unit region according to an occurrence frequency of each of unit regions for unit regions present on a plane within an area having constant brightness in a homogeneous color space including corresponding unit regions, and a mapping device for mapping image data in unit regions decided as those to be subjected to color space compression by the compression deciding device onto other regions in the compressing direction, and for this reason an input color image signal can be compressed into a reproducible color space of a color image forming device so that colors as closest to the original colors as possible can be outputted preserving the color balance and impression of the input color image signal.

The color image converting apparatus and color image converting method thereof according to the present invention comprises a memory for storing therein a range of a reproducible color space of the color image forming device in a homogeneous color space, a converter for converting an input color image signal to a homogeneous color space signal, a divider for dividing a homogeneous color space into a specified number of unit regions, an occurrence frequency counter for obtaining an occurrence frequency of a signal for a homogeneous color space included in each unit region, a distribution discriminator for making a determination according to an occurrence frequency counted by the occurrence frequency counter as to whether a signal for a homogeneous color space is homogeneously distributed on a plane within an area having constant brightness in a homogeneous color space, a region subdivider for subdividing, when it is determined by the distribution discriminator that the signal is homogeneously distributed, an unit region concentrically on a plane within an area having constant brightness in the corresponding homogeneous color space and causing again the occurrence frequency counter to obtain an occurrence frequency regarding the subdivided region as a new unit region, a discriminator for comparing each of the unit regions in the divider or region subdivider to a range of a reproducible color space stored in the memory and making a determination as to whether a signal for a homogeneous color space exists outside a range of the reproducible color space or not, a compression deciding device for deciding, when it is determined by the discriminator that a signal for a homogeneous color space exists outside the range of the reproducible color range, the necessity of color space compression and a compressing direction for each unit region according to an occurrence frequency of each of unit regions for unit regions present on a plane within an area having constant brightness in a homogeneous space including the corresponding unit regions, and mapping device for mapping image data on unit regions decided as those to be subjected to color space compression by the compression deciding device onto other regions in the compressing direction, and for this reason an input color image signal can be compressed into a reproducible color space of a color image forming device so that colors as closest to the original colors as possible can be outputted preserving the color balance and impression of the input color image signal.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image converting apparatus for executing color processing on an input color image and converting the input color image to color image data for a color image forming device to form an image, comprising:
    a memory for storing a range of a reproducible color space of said color image forming device in a homogeneous color space;
    a converter for converting an input color image signal to a signal for a homogeneous color space;
    a divider for dividing a homogeneous color space concentrically and radially on a plane within an area having constant brightness into a specified number of unit regions;
    an occurrence frequency counter for obtaining an occurrence frequency of a signal for a homogeneous color space included in each of said unit regions;
    a discriminator for comparing each of said unit regions to the range of reproducible color space stored in said memory and making a determination as to whether a signal for a homogeneous color space exists outside the range of said reproducible color space;
    a compression deciding device for deciding, when it is determined by said discriminator that a signal for a homogeneous color space exists outside said range of reproducible color space, the necessity of color space compression and compressing direction for each of said unit regions present on a plane within an area having constant brightness in a homogeneous color space according to the occurrence frequency of a signal for a homogeneous color space of each unit region; and
    a mapping device for mapping image data on unit regions subjected to color space compression in said compression deciding device onto other regions in said compressing direction.

2. A method for converting a color image, comprising the steps of:
    dividing a homogeneous color space concentrically and radially on a plane within an area having constant brightness into a specified number of unit regions;
    obtaining a frequency of occurrence of a signal for a homogeneous color space included in each unit region;
    comparing a range of a reproducible color space of a color image forming device in a homogeneous color space to each unit region;
    making a determination as to whether a signal for a homogeneous color space exists outside the reproducible color space;

deciding, when it is determined that a signal for a homogeneous color space is present outside a reproducible color space, the necessity of color space compression and said compressing direction for each unit region according to the frequency of occurrence of said signal for each unit region for unit regions present on a plane within an area having constant brightness; and mapping a unit region decided to be subjected to color space compression onto another region in said compressing direction.

3. A color image converting apparatus for executing color processing on an input color image and converting the input color image to color image data for a color image forming device to form an image, comprising:

a memory for storing a range of a reproducible color space of said color image forming device in a homogeneous color space;

a converter for converting an input color image signal to a signal for a homogeneous color space, a divider for dividing a homogeneous color space concentrically and radially on a plane within an area having constant brightness into a specified number of unit regions;

an occurrence frequency counter for obtaining an occurrence frequency of a signal for a homogeneous color space included in each of said unit regions;

a discriminator for comparing each of said unit regions to the range of reproducible color space stored in said memory and making a determination as to whether a signal for a homogeneous color space exists outside the range of said reproducible color space;

a compressing direction input device for a user to previously input a compressing direction for a unit region;

a compressing direction memory for storing said compressing direction inputted by said compressing direction input device;

a compression deciding device for deciding, when it is determined by said discriminator that a signal for a homogeneous color space exists outside said range of reproducible color space, the necessity of color space compression and compressing direction for each of said unit regions present on a plane within an area having constant brightness in a homogeneous color space according to the occurrence frequency of a signal for a homogeneous color space of each unit region; and a mapping device for mapping image data on unit regions decided as those to be subjected to color space compression in said compression deciding device onto other regions in said compressing direction.

4. A method for converting a color image, comprising the steps of:

dividing a homogeneous color space concentrically and radially on a plane within an area having constant brightness into a specified number of unit regions;

inputting a compression direction for each unit region;

storing said inputted compressing direction;

deciding the necessity of color space compression and said compressing direction for each unit region according to a frequency of occurrence of each unit region as well as stored compressing direction; and mapping a unit region decided to be subjected to color space compression onto another region in said compressing direction.

5. A color image converting apparatus for executing color processing on an input color image and converting the input color image to color image data for a color image forming device to form an image, comprising:

a memory for storing a range of a reproducible color space of said color image forming device in a homogeneous color space;

a converter for converting an input color image signal to a signal for a homogeneous color space, a divider for dividing a homogeneous color space concentrically and radially on a plane within an area having constant brightness into a specified number of unit regions;

an occurrence frequency counter for obtaining an occurrence frequency of a signal for a homogeneous color space included in each of said unit regions;

a distribution discriminator for making a determination according to the occurrence frequency counted by said occurrence frequency counter as to whether the occurrence frequency of a signal for a homogeneous color space is homogeneously distributed on a plane within an area having constant brightness in a homogeneous color space;

a region subdivider for subdividing a unit region concentrically, when it is determined by said distribution discriminator that the occurrence frequency of a signal for a homogeneous color space is homogeneously distributed, on a plane within an area having constant brightness in said corresponding homogeneous color space and causing again said occurrence frequency counter to obtain an occurrence frequency regarding a subdivided region as a new unit region;

a discriminator for comparing each unit region decided by said divider or said region subdivider to a range of a reproducible color space stored in said memory and making a determination as to whether a signal for a homogeneous color space exists outside a range of said reproducible color space;

a compression deciding device for deciding, when it is determined by said discriminator that a signal for a homogeneous color space exists outside said range of reproducible color space, the necessity of color space compression and compressing direction for each of said unit regions present on a plane within an area having constant brightness in a homogeneous color space according to the occurrence frequency of each unit region; and a mapping device for mapping image data on unit regions decided as those to be subjected to color space compression in said compression deciding device onto other regions of said compressing direction.

6. A method for dividing a homogeneous color space, comprising:

dividing a homogeneous color space concentrically and radially on a plane within an area having constant brightness into a specified number of unit regions;

making a determination according to a frequency of occurrence as to whether the occurrence frequency of a signal for a homogeneous color space is distributed on a plane within an area having constant brightness in said homogeneous color space;

subdividing a unit region concentrically on a plane within an area having constant brightness of said corresponding homogeneous color space when said occurrence frequency of a signal is distributed homogeneously; and obtaining a frequency of occurrence regarding said subdivided region as a new unit region.

* * * * *